Nov. 14, 1944. H. L. NORTHUP 2,362,843
OIL SEAL
Filed Dec. 22, 1938
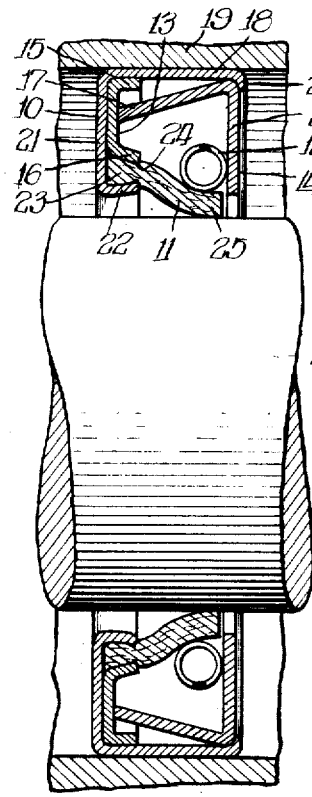
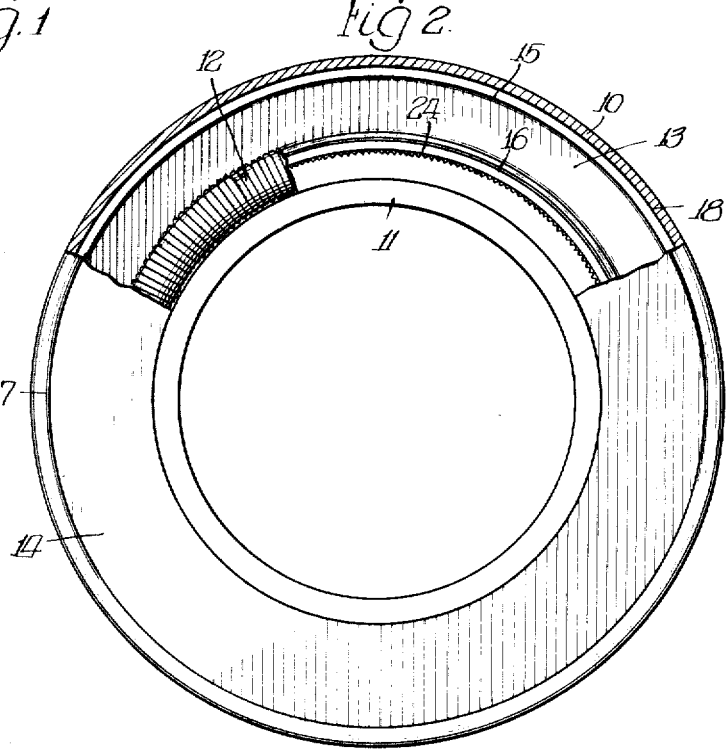
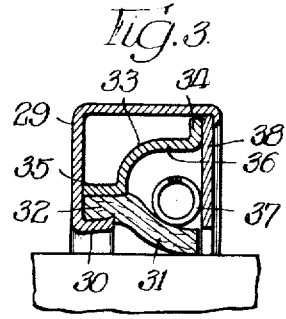
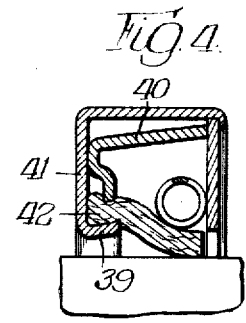
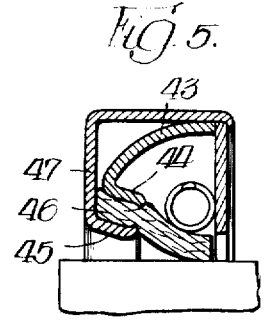
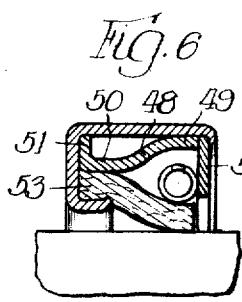
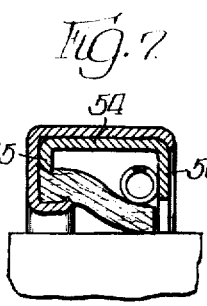
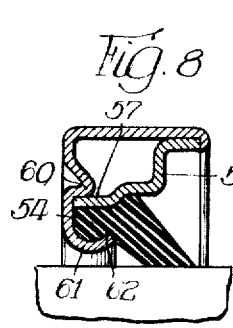
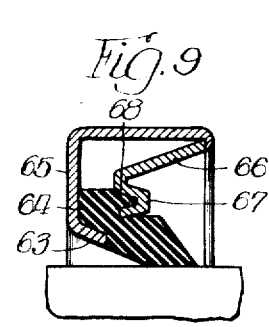
INVENTOR.
Harry L. Northup,
BY Cromwell, Greist & Warden
ATTORNEYS.

Patented Nov. 14, 1944

2,362,843

UNITED STATES PATENT OFFICE

2,362,843

OIL SEAL

Harry L. Northup, Chicago, Ill., assignor to Chicago Rawhide Manufacturing Company, Chicago, Ill., a corporation of Illinois Application December 22, 1938, Serial No. 247,154

4 Claims. (Cl. 288—3)

This invention relates to oil seals of the type in which the packing member is a narrow somewhat conical band of flexible material which is secured to the casing of the seal by having its larger end sleeved over a reentrant flange on the casing in tightly clamped engagement with the flange.

The principal purpose of the invention is to provide an improved seal of the type described which can be manufactured at comparatively small cost, is strong and durable in construction, and will serve effectively to prevent any leakage of oil.

Other more specific objects and advantages of the invention will be apparent to those skilled in the art upon a full understanding of the construction, arrangement and function of the parts which have been combined to form the seal.

Several different embodiments of the invention are presented herein for the purpose of exemplification, but it will of course be appreciated that the invention is susceptible of incorporation in still other structurally modified forms coming equally within the scope of the appended claims.

In the accompanying drawing:

Fig. 1 is a diagrammatic section through a seal constructed in accordance with the invention, showing the seal positioned in a housing about a shaft;

Fig. 2 is a partially sectioned end view of the same seal; and

Figs. 3 to 9 inclusive are radial sections through several other structurally modified seals which are also constructed in accordance with the invention.

The seal shown in Figs. 1 and 2 will first be described. This seal is composed of a centrally apertured sheet metal cup 10, a packing member 11 of leather, synthetic rubber or other suitable material, in the form of a narrow somewhat conical band, an endless coil spring 12, and two clamping members 13 and 14, the member 13 being a sheet metal ring of channeled radial section with an outer flange 15 and an inner flange 16, and the member 14 being a centrally apertured sheet metal ring of L-shaped radial section with an inturned outer flange 17.

The cup 10 provides a cage-like casing for the other parts of the seal. This casing is characterized by a cylindrical outer wall 18 for press-fit engagement within a housing 19 through which a shaft 20 extends, an end wall 21 which extends radially inward from one end of the outer wall 18 to a point adjacent the shaft 20, and a small reentrant flange 22 which extends axially from the inner edge of the end wall 21 back into the interior of the casing.

The large diameter end 23 of the tubular packing member 11 is sleeved over the reentrant flange 22 on the inside of the casing, and the clamping ring 13 is positioned against the end wall 21 of the casing with its outer flange 15 bearing against the outer wall of the casing and its inner flange 16 clamped against the large diameter end 23 of the packing member in directly opposed relation to the reentrant flange 22 on the casing. The two flanges 16 and 22 are clamped tightly against the end 23 of the packing member and converge somewhat toward their edges, whereby to lock the interposed end 23 securely in place. The extreme edge of the flange 16 is preferably provided with a plurality of fine closely arranged teeth-like projections 24 which are embedded in the outer surface of the packing member, while the extreme edge of the flange 22 is preferably turned outwardly a little into more tightly compressed engagement with the main surface of the packing member. The flange 15 of the clamping ring 13 may be so dimensioned as to wedge tightly against the inside surface of the outer wall 18 of the casing, whereby to reinforce the casing radially at that point, but this flange and also the adjacent outer portion of the clamping ring may be entirely eliminated if desired.

The small diameter end 25 of the packing member is designed for relatively rotatable but oil-tight engagement with the periphery of the shaft 20, and is encircled by the spring 12, which spring serves to resiliently construct the packing about the shaft.

The clamping ring 14 serves to hold the clamping ring 13 in position, and also serves to hold the spring 12 in position. The ring 14 is preferably of such size as to just fit within the outer wall 18 of the casing, flush with the edge of the wall 18, and is characterized by an end wall 26 and the previously described inturned flange 17. The flange 17 extends from the outer edge of the end wall 26 to a point well inwardly of the outer edge of the clamping ring 13. The end wall 26 holds the spring 12 in place, while the edge of the inturned flange 17 holds the ring 13 in place. The ring 14 is clamped tightly against the ring 13 and is permanently held in that position by a small inturned edge 27 on the outer wall 18 of the casing.

In securing the packing member to the reentrant flange 22 the latter may be forced outwardly at its free edge by any suitable expansion means, and may also be indented or offset a little at intervals whereby to lock the packing member securely against any possibility of rotation.

The seal shown in Fig. 3—like the first described seal—includes a casing 29 which is provided with a reentrant flange 30, and a tubular packing member 31 which has its large diameter end 32 sleeved over the reentrant flange 30. In this seal the end 32 of the packing member is clamped against the reentrant flange 30 of the casing by means of a clamping ring 33 which has a small radially extending flange 34 at its outer edge and a small axially extending flange 35 at its inner edge. The flanges 34 and 35 are connected together by an intervening section 36 which extends diagonally between the two flanges and is preferably curved to provide ample space for the accommodation of the spring 37. The flange 35 on the ring 33 cooperates with the reentrant flange 30 on the casing to secure the packing member in place. The ring 33 is held in place by means of a clamping washer 38 which engages with the foot-like flange 34 on the ring 33. If desired, the flange 34 on the ring 33 may be omitted. Also, the diagonally extending section 36 of the ring 33, instead of being dished, can be made conical or given some other shape which will not interfere with the spring 37.

The seal shown in Fig. 4 differs from the one shown in Fig. 3 in that the clamping ring which engages with the large diameter end of the packing is of a different shape. Instead of being provided with a flange opposite the reentrant flange 39 on the casing, the clamping ring 40 is offset at its inner edge away from the end wall 41 of the casing and extends radially inward into sharply localized clamping engagement with the large diameter end 42 of the packing at a point spaced from the end wall of the casing.

The seal shown in Fig. 5 differs from those shown in Figs. 3 and 4 in that the clamping ring 43 is provided with a reentrant flange 44 opposite the reentrant flange 45 on the casing, and the large diameter end 46 of the packing is securely gripped between these two reentrant flanges, both of which extend in the same general direction. In this particular seal the reentrant flanges 44 and 45 are both somewhat conical in shape, with the result that when the clamping ring 43 is forced axially into the casing about the packing it will become tightly wedged against the latter and in its final position may be spaced somewhat from the end wall 37 of the casing.

The seal shown in Fig. 6 contains a clamping ring 48 which is characterized by a large diameter end 49, a small diameter end 50 and an outturned flange 51. The end 49 of the clamping ring is engaged under pressure by a closure washer 52, while the end 50 of the clamping ring embraces the large diameter end 53 of the packing. The outturned flange 51 provides a strut-like radial reinforcement for the small diameter end 50 of the clamping ring.

In the seal of Fig. 7 the closure washer used in the previously described seals is eliminated and the clamping ring 54 is provided with inturned flanges 55 and 56 at both of its ends. The flange 55 grips the packing and is preferably beveled a little in order to pinch the latter into the form of a small locking bead at its large diameter end, while the flange 56 retains the spring in place on the free lip of the packing.

In the seals shown in Figs. 8 and 9 the packing members are moulded from synthetic rubber or other suitable material and are specially shaped to conform to the portions of the reentrant flanges and clamping rings between which they are held. There are no springs in these particular seals, but it will of course be appreciated that springs of any sort can be included, end closures for the casings being added if needed to retain such springs in position. While springs have been shown in connection with all of the above described embodiments of the invention, it will of course be appreciated that the springs could be omitted, and that the end closure washers could also be omitted in those constructions wherein the clamping ring can be engaged directly by an inturned edge on the end of the outer wall of the casing.

In the seal of Fig. 8, the small diameter end 57 of the clamping ring 58 engages with the outer surface of the packing 59 and may be advantageously confined within a backing rib 60 formed on the inside of the end wall of the casing, while the reentrant flange 61 on the casing is preferably curved outwardly into a small groove 62 formed in the inner surface of the packing, thereby securely locking the packing in position.

In the seal of Fig. 9 the reentrant flange 63 on the casing is disposed at an inclination to the axis of the seal and the large diameter end 64 of the packing is clamped against this flange and also against the end wall 65 of the casing by a clamping ring 66, which clamping ring has a channel portion 67 which conforms with a bead 68 provided on the large diameter end 64 of the packing.

In applying the invention to external seals, that is, seals in which the casing is fixedly secured to the shaft and the packing member is located at the outer periphery of the seal for relatively rotatable coaction with the surrounding machine part, the parts in each of the above described seals will of course be reversed radially, with the reentrant flange of the casing located at the outside instead of at the inside of the casing.

I claim:

1. A self-contained sealing unit of the type described, comprising a centrally apertured sheet metal cup for pressed fit insertion within a housing about a centrally located shaft, which cup is provided about the aperture in the bottom thereof with an integrally formed reentrant flange, a narrow somewhat conical band of flexible packing material, one edge of which is slightly larger than the other and is sleeved over the reentrant flange, an axially opening annular channel member which opens axially of the cup in the direction of projection of said reentrant flange and which is positioned against the bottom of the cup between the rim of the latter and the larger edge of the band of packing material in radially clamped engagement with such edge, and a second cup which is provided with a rim having an edge of substantially reduced diameter positioned within the channel member in axially clamped engagement with the bottom of the latter.

2. A self-contained sealing unit of the type described, comprising a centrally apertured sheet metal cup for pressed fit insertion within a housing about a centrally located shaft, which cup is provided about the aperture in the bottom thereof with an integrally formed reentrant flange, a narrow somewhat conical band of flexible packing material, one edge of which is slightly larger than the other end is sleeved over the reentrant flange, an axially opening annular channel member which opens axially of the cup in the direction of projection of said reentrant flange and is characterized by inner and outer marginal flanges, said channel member being positioned adjacent the bottom of the cup with the outer marginal flange of the channel member in engagement with the rim of the cup and the inner marginal flange of the channel member in radially clamped engagement with the larger edge of the band of packing material, outwardly of said reentrant flange, and a second cup which is provided with a rim having an edge of substantially reduced diameter positioned within the channel member inwardly of said outer marginal flange in axially clamped engagement with the bottom of the channel member, said reentrant and inner marginal flanges converging towad each other in their direction of projection in gripping the larger edge of the band between them.

3. A self-contained sealing unit of the type described, comprising a centrally apertured sheet metal cup for pressed fit insertion within a housing about a centrally located shaft, which cup is provided about the aperture in the bottom thereof with an integrally formed reentrant flange, a narrow somewhat conical band of flexible packing material, one edge of which is slightly larger than the other and is sleeved over the reentrant flange, an axially opening annular channel member which opens axially of the cup in the direction of projection of said reentrant flange and is characterized by inner and outer marginal flanges, said channel member being positioned adjacent the bottom of the cup with the outer marginal flange of the channel member in engagement with the rim of the cup and the inner marginal flange of the channel member in radially clamped engagement with the larger edge of the band of packing material, outwardly of said reentrant flange, and a second cup which is provided with a rim having an edge of substantially reduced diameter positioned within the channel member inwardly of said outer marginal flange in axially clamped engagement with the bottom of the channel member, said reentrant and inner marginal flanges converging toward each other in their direction of projection in gripping the larger edge of the band between them, with said reentrant flange increasing in diameter in said direction and said inner marginal flange decreasing in diameter in the same direction.

4. A self-contained sealing unit of the type described, comprising a centrally apertured sheet metal cup for pressed fit insertion within a housing about a centrally located shaft, which cup is provided about the aperture in the bottom thereof with an integrally formed reentrant flange, a narrow somewhat conical band of flexible packing material, one edge of which is slightly larger than the other and is sleeved over the reentrant flange, an axially opening annular channel member which opens axially of the cup in the direction of projection of said reentrant flange and is characterized by inner and outer marginal flanges, said channel member being positioned adjacent the bottom of the cup with the outer marginal flange of the channel member in engagement with the rim of the cup and the inner marginal flange of the channel member in radially clamped engagement with the larger edge of the band of packing material, outwardly of said reentrant flange, and an annular member which engages with the inside of the rim of the cup adjacent the edge of the latter and is provided adjacent the channel member with a portion of substantially reduced diameter, which portion is positioned within the channel member inwardly of the outer marginal flange of the latter in axially clamped engagement with the bottom of the channel member.

HARRY L. NORTHUP.

CERTIFICATE OF CORRECTION.

Patent No. 2,362,843.  November 14, 1944.

HARRY L. NORTHUP.

It is hereby certified that error appears in the printed specification of the above numbered patent requiring correction as follows: Page 1, second column, line 36, for the word "construct" read --constrict--; page 2, first column, line 55, for the numeral "37" read --47--; page 3, first column, line 18, claim 2, for "towad" read --toward--; and that the said Letters Patent should be read with this correction therein that the same may conform to the record of the case in the Patent Office.

Signed and sealed this 13th day of February, A. D. 1945.

Leslie Frazer (Seal)  Acting Commissioner of Patents.

flange, an axially opening annular channel member which opens axially of the cup in the direction of projection of said reentrant flange and is characterized by inner and outer marginal flanges, said channel member being positioned adjacent the bottom of the cup with the outer marginal flange of the channel member in engagement with the rim of the cup and the inner marginal flange of the channel member in radially clamped engagement with the larger edge of the band of packing material, outwardly of said reentrant flange, and a second cup which is provided with a rim having an edge of substantially reduced diameter positioned within the channel member inwardly of said outer marginal flange in axially clamped engagement with the bottom of the channel member, said reentrant and inner marginal flanges converging towad each other in their direction of projection in gripping the larger edge of the band between them.

3. A self-contained sealing unit of the type described, comprising a centrally apertured sheet metal cup for pressed fit insertion within a housing about a centrally located shaft, which cup is provided about the aperture in the bottom thereof with an integrally formed reentrant flange, a narrow somewhat conical band of flexible packing material, one edge of which is slightly larger than the other and is sleeved over the reentrant flange, an axially opening annular channel member which opens axially of the cup in the direction of projection of said reentrant flange and is characterized by inner and outer marginal flanges, said channel member being positioned adjacent the bottom of the cup with the outer marginal flange of the channel member in engagement with the rim of the cup and the inner marginal flange of the channel member in radially clamped engagement with the larger edge of the band of packing material, outwardly of said reentrant flange, and a second cup which is provided with a rim having an edge of substantially reduced diameter positioned within the channel member inwardly of said outer marginal flange in axially clamped engagement with the bottom of the channel member, said reentrant and inner marginal flanges converging toward each other in their direction of projection in gripping the larger edge of the band between them, with said reentrant flange increasing in diameter in said direction and said inner marginal flange decreasing in diameter in the same direction.

4. A self-contained sealing unit of the type described, comprising a centrally apertured sheet metal cup for pressed fit insertion within a housing about a centrally located shaft, which cup is provided about the aperture in the bottom thereof with an integrally formed reentrant flange, a narrow somewhat conical band of flexible packing material, one edge of which is slightly larger than the other and is sleeved over the reentrant flange, an axially opening annular channel member which opens axially of the cup in the direction of projection of said reentrant flange and is characterized by inner and outer marginal flanges, said channel member being positioned adjacent the bottom of the cup with the outer marginal flange of the channel member in engagement with the rim of the cup and the inner marginal flange of the channel member in radially clamped engagement with the larger edge of the band of packing material, outwardly of said reentrant flange, and an annular member which engages with the inside of the rim of the cup adjacent the edge of the latter and is provided adjacent the channel member with a portion of substantially reduced diameter, which portion is positioned within the channel member inwardly of the outer marginal flange of the latter in axially clamped engagement with the bottom of the channel member.

HARRY L. NORTHUP.

CERTIFICATE OF CORRECTION.

Patent No. 2,362,843.      November 14, 1944.

HARRY L. NORTHUP.

It is hereby certified that error appears in the printed specification of the above numbered patent requiring correction as follows: Page 1, second column, line 36, for the word "construct" read --constrict--; page 2, first column, line 55, for the numeral "37" read --47--; page 3, first column, line 18, claim 2, for "towad" read --toward--; and that the said Letters Patent should be read with this correction therein that the same may conform to the record of the case in the Patent Office.

Signed and sealed this 13th day of February, A. D. 1945.

Leslie Frazer (Seal)      Acting Commissioner of Patents.